(12) United States Patent
Bishop et al.

(10) Patent No.: US 9,787,587 B2
(45) Date of Patent: Oct. 10, 2017

(54) METHOD AND APPARATUS FOR BIDIRECTIONAL MESSAGE ROUTING BETWEEN SERVICES RUNNING ON DIFFERENT NETWORK NODES

(71) Applicant: SwiftStack, Inc., San Francisco, CA (US)

(72) Inventors: Darrell Bishop, San Francisco, CA (US); Samuel N. Merritt, San Francisco, CA (US); Joe Arnold, San Francisco, CA (US)

(73) Assignee: SwiftStack, Inc., San Francisco, CA (US)

( * ) Notice: Subject to any disclaimer, the term of this patent is extended or adjusted under 35 U.S.C. 154(b) by 84 days.

(21) Appl. No.: 14/709,439

(22) Filed: May 11, 2015

(65) Prior Publication Data
US 2016/0105361 A1 Apr. 14, 2016

Related U.S. Application Data

(60) Provisional application No. 62/062,895, filed on Oct. 12, 2014.

(51) Int. Cl.
*H04L 12/741* (2013.01)
*H04L 29/06* (2006.01)

(52) U.S. Cl.
CPC ............ *H04L 45/74* (2013.01); *H04L 63/029* (2013.01); *H04L 63/0272* (2013.01); *H04L 69/22* (2013.01)

(58) Field of Classification Search
CPC ... H04L 45/74; H04L 63/0272; H04L 63/029; H04L 69/22
See application file for complete search history.

(56) References Cited

U.S. PATENT DOCUMENTS

| | | | | |
|---|---|---|---|---|
| 2002/0141491 A1* | 10/2002 | Corts | ................ | G06Q 30/0269 375/216 |
| 2003/0097331 A1* | 5/2003 | Cohen | .................... | G06Q 20/10 705/39 |
| 2003/0233541 A1* | 12/2003 | Fowler | .................. | H04L 9/3265 713/155 |
| 2012/0233668 A1* | 9/2012 | Leafe | .................... | G06F 9/5022 726/4 |
| 2013/0287026 A1* | 10/2013 | Davie | .................... | H04L 49/70 370/392 |
| 2013/0340050 A1* | 12/2013 | Harrison | ................. | H04L 63/10 726/4 |
| 2014/0013108 A1* | 1/2014 | Pellikka | .............. | H04L 63/0807 713/156 |

(Continued)

*Primary Examiner* — Fan Ng
(74) *Attorney, Agent, or Firm* — Perkins Coie LLP

(57) ABSTRACT

Methods and systems are disclosed for secure bi-directional message routing between services running on a different nodes in a computer cluster. According to some embodiments, a multi-tenant computer cluster is accessed online via a controller. The controller, acting as central management system, may establish secure independent connections with each of the many nodes. Messages from the controller to any given node, and vice versa, are wrapped in a routing envelope and transferred over an independent and secure virtual private network tunnel. This allows the plurality of nodes to be centrally managed and utilized as a cluster while not being allowed to communicate with each other.

33 Claims, 15 Drawing Sheets

(56) References Cited

U.S. PATENT DOCUMENTS

| | | | | |
|---|---|---|---|---|
| 2014/0162601 A1* | 6/2014 | Kim | ...................... | H04W 12/06 |
| | | | | 455/411 |
| 2015/0188814 A1* | 7/2015 | Jain | ........................ | H04L 45/74 |
| | | | | 370/392 |
| 2015/0319229 A1* | 11/2015 | Dillon | ............... | G06F 17/30864 |
| | | | | 709/203 |
| 2015/0358322 A1* | 12/2015 | Krieger | ................ | H04W 12/06 |
| | | | | 713/181 |

* cited by examiner

METHOD AND APPARATUS FOR BIDIRECTIONAL MESSAGE ROUTING BETWEEN SERVICES RUNNING ON DIFFERENT NETWORK NODES

CROSS-REFERENCE TO RELATED APPLICATION(S)

This application is entitled to the benefit of and/or the right of priority to U.S. Provisional Application No. 62/062,895, entitled, "METHOD AND APPARATUS FOR BIDIRECTIONAL MESSAGE ROUTING BETWEEN SERVICES RUNNING ON DIFFERENT NETWORK NODES", filed Oct. 12, 2014, which is hereby incorporated by reference in its entirety for all purposes. This application is therefore entitled to a priority date of Oct. 12, 2014.

TECHNICAL FIELD

The disclosed embodiments concern a method and apparatus for bidirectional message routing between services running on different network nodes.

BACKGROUND

The OpenStack Object Storage system, aka "Swift," is a multitenant, highly scalable, and durable object storage system designed to store large amounts of unstructured data at low cost. Highly scalable means that it can scale from a few nodes and a handful of drives to thousands of clustered machines with multiple petabytes of storage.

Swift is designed to be horizontally scalable so there is no single point-of-failure. Swift is used by businesses of all sizes, service providers, and research organizations worldwide. It is typically used to store unstructured data, such as documents, Web and media content, backups, images, and virtual machine snapshots. Originally developed as the engine behind the RackSpace Cloud Files storage service in 2010, it was open-sourced under the Apache 2 license as part of the OpenStack project. With more than 100 companies and thousands of developers now participating in the OpenStack project, the usage of Swift is increasing rapidly.

Swift is not a traditional file system or a raw block device. Instead, it enables users to store, retrieve, and delete objects, with their associated metadata, in containers via a RESTful HTTP API. Developers can either write directly to the Swift API or use one of the many client libraries that exist for all popular programming languages, such as Java, Python, Ruby, and C#. Some key characteristics of Swift, which differentiate it from other storage systems, include that is was designed to store and serve content to many concurrent users, run on industry-standard x86 servers, and manage its storage servers with no additional vendor specific hardware needed.

Several services may run on a Swift cluster, including proxy, account, container, and storage services. Proxy services handle the external communication with clients and the storage services handle the storage and maintenance of data stored in Swift. An account in Swift represents a user in the storage system. Unlike other storage systems which create volumes, Swift creates accounts, which enable multiple users and applications to access the storage system at the same time. Accounts and containers store key information about themselves in separate databases that are distributed throughout the system (Swift Account DB). Swift accounts can create and store data in individual containers. Containers are namespaces used to group objects within an account. Although containers cannot be nested, they are conceptually similar to directories or folders in a file system.

Once a cluster has been configured, data is put into and taken out of it over a RESTful HTTP API. By default Swift stores and maintains multiple copies of each piece of data, with each copy being kept as far from the others as possible, e.g. different regions, zones, and drives. This ensures data integrity and accessibility.

To manage a Swift cluster, a central management system (or "controller") provides operators (e.g. the example Bob's Business shown in FIG. 1) with a browser-based interface and system to easily manage Swift nodes, configure networking, and user accounts for their organization's cluster. Operators use the Controller for monitoring, authentication integration, alert, system statistics, and reporting. These statistics and reports are based on accurately aggregated data and allow operators to determine storage utilization relating to chargeback and billing. This is useful for customers who leverage the multi-tenancy of the Controller to allow their own customers (e.g. the example Alice's Company as shown in FIG. 1) to use and store data via the Controller.

The Controller is accessed online and its management of the cluster is independent of the data storage performed by the nodes. When a multitenant central management system is accessed over an insecure network by customers on other unknown networks, this creates a set of challenges including the need for a communications channel between the central management system and the nodes that is secure and persistent over the Internet.

For a central management system with multitenant, multi-network distributed nodes there is a need for secure management and monitoring. The central management system needs to establish a one-to-many connection to all the nodes, while the client nodes need a one-to-one connection with the central management system. Once established, the connection must provide bidirectional communication to allow processes (e.g. daemons executing on the nodes and central management system) to securely communicate with each other as though operating on the same network. Embodiments of the present disclosure describe novel systems and methods that provide for secure channels that can:

(1) ensure that nodes from other tenants are never aware of or able to access the communication channel of another tenant; and (2) be easily and securely reestablished after a network interruption.

SUMMARY

Embodiments of the present disclosure describe methods, systems and apparatus for routing messages between services running on different nodes in a computer cluster. According to some embodiments, a node router process at a controller node receives from a service running at the controller node, a message wrapped in a routing envelope. The routing envelope may include a name of a service at another node, of a plurality of nodes in the computer cluster, to which the message is to be sent. The name of the node service may include a universally unique identifier (UUID) of the node on which the service resides. The node router service determines an ephemeral ID associated with the other node by comparing the received UUID of the other node (part of the name of the service) to an associative table that relates UUIDs to ephemeral IDs for one or more of the plurality of other nodes in the computer cluster. The node router process then transmits the routing envelope containing the message to the other node via a secure virtual private network tunnel using the ephemeral ID of the destination node. The envelope is received at the destination node by a node relay process that then routes the envelope to the correct service based on the name of the node service.

In response, the node router process receives a routing envelope containing a response to the previously sent message. The node router process then forwards the routing envelope containing the response to the service at the controller node.

According to some embodiments, a node relay process at a node in the computing cluster receives from a service running at that node, a message wrapped in a routing envelope. The routing envelope may include a name of a service at the controller node, to which the message is to be sent. Using the name of the service at the controller node, the node relay process transmits the routing envelope to the node router process at the controller node. Using the name of the service at the controller node, the node router process then forwards the routing envelope to serve at the controller node. In some embodiments, the node router process compares the name of the service at the controller node to an associative table relating the name of the service at the controller node to an ephemeral identifier associated with the service at the controller node. Using the ephemeral identifier, the node router process forwards the routing envelope to the service at the controller node.

In response, the node router process receives a routing envelope including a response to the message. The node routing process transmits the routing envelope to the node relay process at the node in the computing cluster. The node relay process then forwards the routing envelope to the service at the node, from which the original message originated.

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

DETAILED DESCRIPTION

Figure 1:
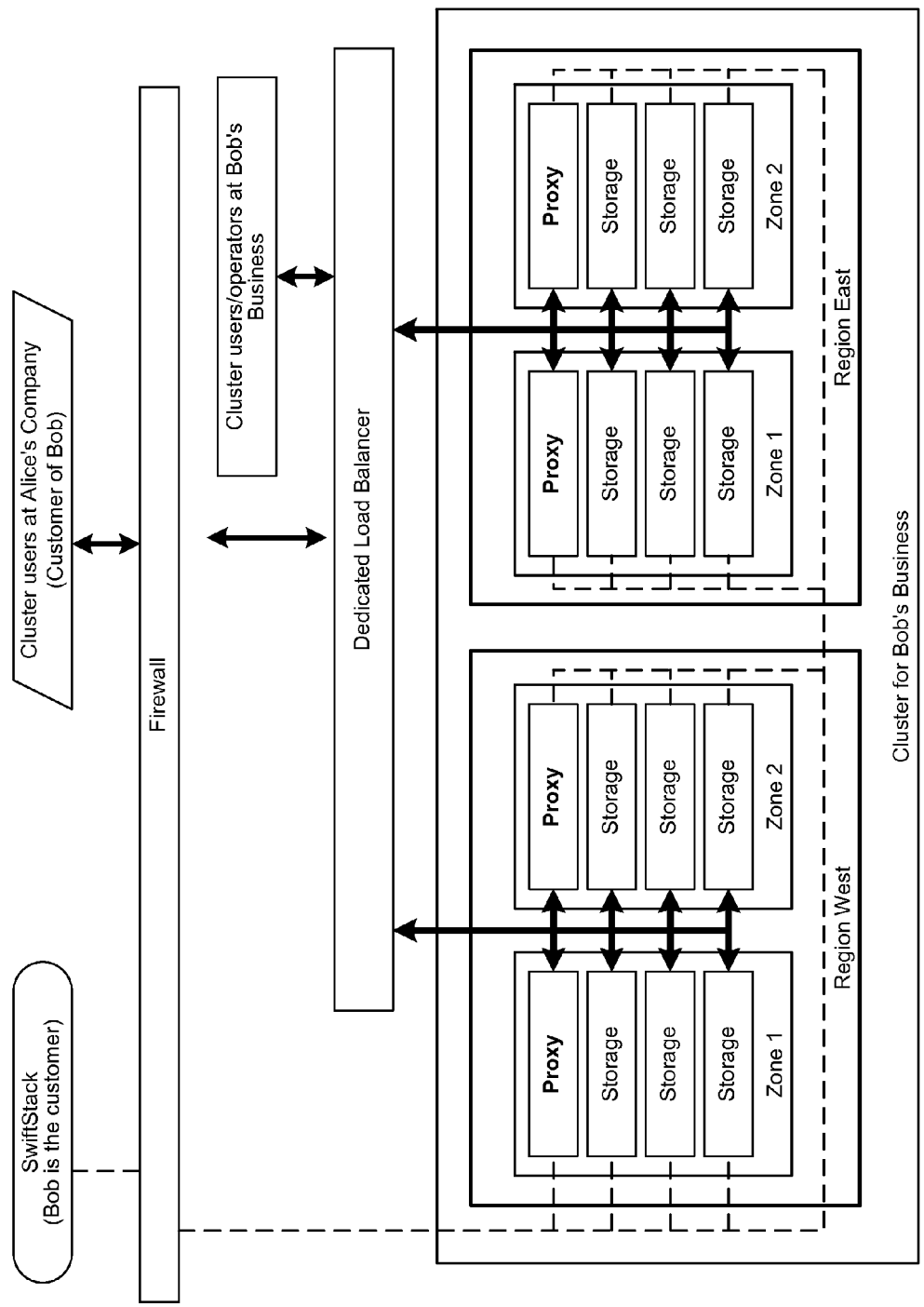
FIG. 1 is a block schematic diagram showing an example embodiment of a system architecture, in which one or more aspects of the present disclosure may be implemented.
Figure 2:
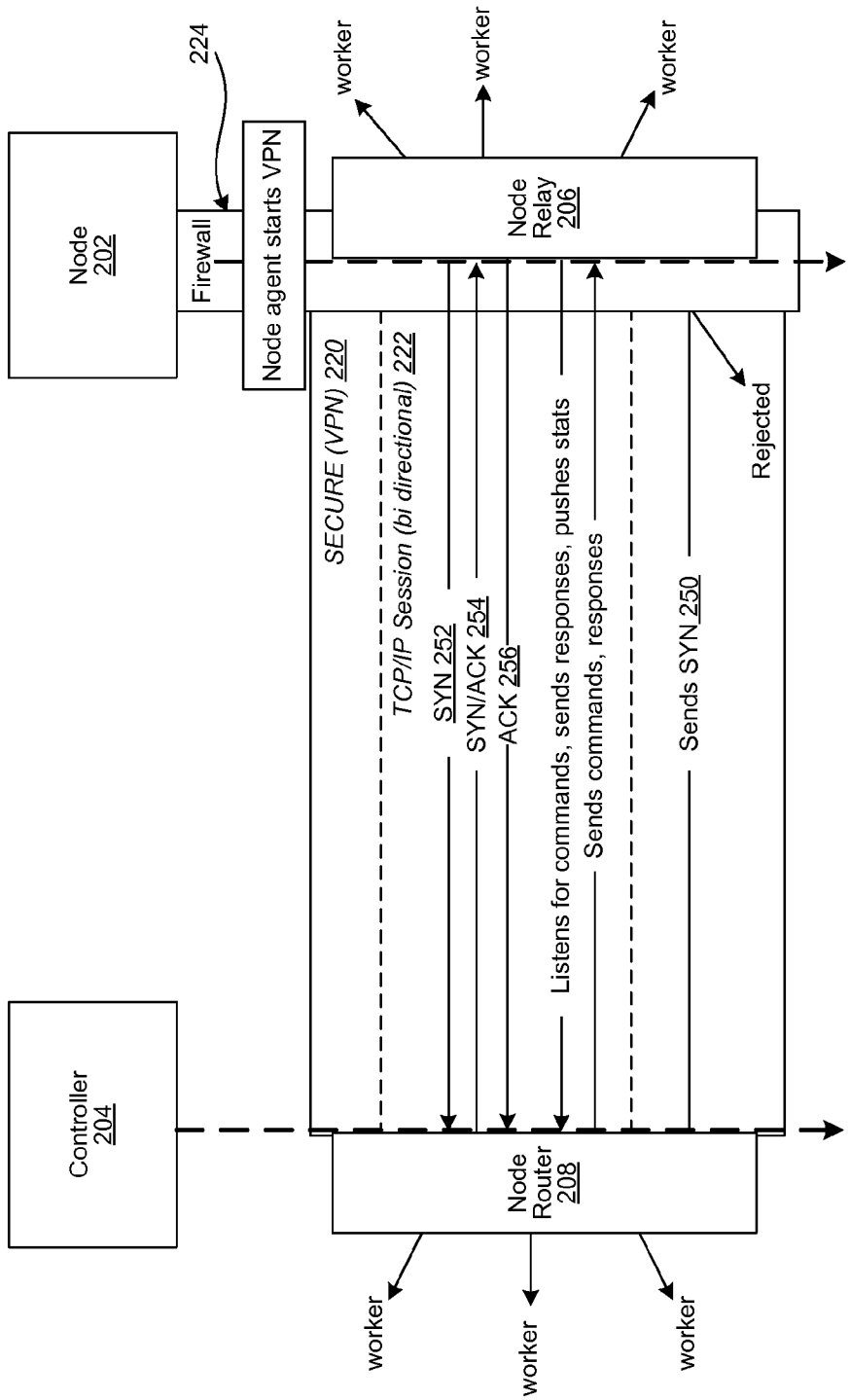
FIG. 2 is a schematic flow diagram showing an example process of establishing a connection with a node router process on a central management system, according to some embodiments.

Bidirectional Message Routing Between Services Running on Different Network Nodes FIG. 2 shows a schematic flow diagram 200 illustrating an example process of establishing a connection with a node router process on a central management system, according to some embodiments of the present disclosure. According to some embodiments connections (e.g. via a transfer protocol such as TCP/IP) are initiated in one direction, in this case from a node 202 to a controller 204. Note the terms "controller" and "central management system" may be used interchangeably through this specification. It shall be understood that TCP/IP refers to an entire suite of transfer protocols, that may include, but is not limited to TCP (Transmission Control Protocol) and UDP (User Datagram Protocol). Further, TCP/IP represents just one set of transfer protocols and that the present teachings may be applied to data transferred using any transfer protocol suitable for the bi-directional routing of messages. A virtual private network (VPN) 220 tunnel includes a firewall 224 that rejects all session initiation requests (e.g. SYN request 250 to initiate a TCP/IP session) made to the node 202. Rejecting requests made to the node 202, may reduce and/or eliminate the risk of unauthorized access to the node (e.g. as caused by a breach of the controller 204). According to some embodiments, a communications session is established by a three-way hand shake initiated from a node. For example, as illustrated in FIG. 2, a given node 202 initiates a bi-directional communication session with the controller 204 by sending a request (e.g. SYN 252). In response, the controller 204 acknowledges the node's 202 request (SYN/ACK 254). The node 202 then acknowledges the controller's 204 acknowledgement (e.g. ACK 256). This three-way handshake establishes a bi-directional communication path 222 (e.g. via TCP/IP) with controller 204.

The node 202, communicating with the controller 204 over this secure VPN connection 220, may perform one or more of the following functions:

Use heart-beating to detect and correct communication interruptions

Listen for commands and send responses

Push unidirectional statistics

Send periodic messages regarding node and drive state and health

Send aggregated data regarding account utilization

Query the controller for a configuration fingerprint and disable Swift if the node has a stale configuration.

According to some embodiments, a node relay process 206 started at a node 202 establishes a connection 222 (e.g.

via TCP/IP) with the node router process 208 on the central management system 204. Communication takes place over the VPN tunnel 220 with firewall 224 that rejects all requests made to the node 202.

In a cluster environment comprised of one or more nodes, each of the one or more nodes 202 may be connected to the controller 204 via a unique, independent VPN tunnel 220. The node router process 208 at the controller 204 receives connections from each node 202 over that node's unique VPN tunnel 220. Because nodes may be owned and managed by different customers, messages are never routed by the node router process 208 service at the controller 204 directly from one node 202 to another. In other words, messages are only routed from a service daemon on a node to a service daemon on the controller 204 or from a service daemon on the controller to a service daemon on a node.

Figure 3:
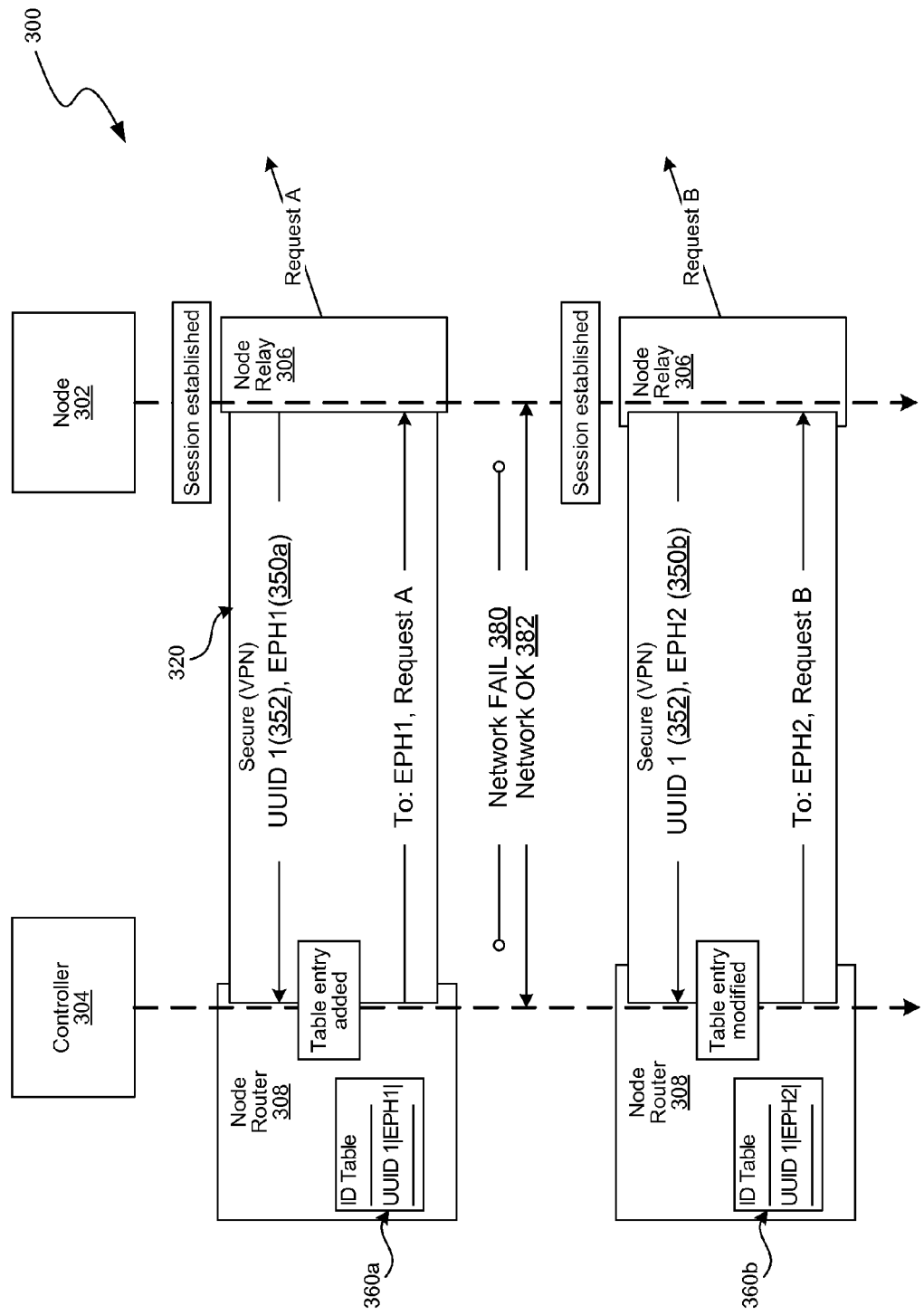
FIG. 3 is a schematic flow diagram showing example processes of re-establishing a connection between a node and a central management system, according to some embodiments.

FIG. 3 is a schematic flow diagram showing example processes of re-establishing a connection between a node and a central management system after a network interruption, according to some embodiments. As shown in FIG. 3, when a connection (e.g. via TCP/IP) is first established, a node 302 sends both a unique, ephemeral identifier 350a as well as its UUID (Universally Unique Identifier) 352 to the controller 304 via a secure VPN tunnel 320 unique between that node 302 and the controller 304. The controller 304 registers the node 302 by the ephemeral identifier (EPH ID) 350a, also storing the UUID value 352 and maps the association between the identifiers. This is indicated by the ID table 360a shown at node router 308 in FIG. 3. Accordingly, a service at a controller 304 may send a message to service at a node 302 with only a name associated with the service at the node 302 (the name including the UUID of the node 302). Having received this message from the service at the controller, the node router 308 can compare the UUID (include in the name of the service at the node 302) to the ID table 360a to retrieve the EPH ID 350a associated with the node 302. The node router 308 may then transmit the message to the node 302 using the EPH ID 350a associated with the node 302. When there is a network disruption (indicated at 380) which is then repaired (indicated at 382), the new connection from the node 302 has a different ephemeral identifier (350b). The new ephemeral identifier may be generated by an external library, for example, a ZeroMQ (or ZMQ) library. The node router process 308 at the controller 304 then discards the old connection information and immediately updates the mapping between the new ephemeral identifier 350b and node UUID 352 as indicated by the ID table 360b shown at node router process 308 in FIG. 3.

When a service on a controller needs to communicate with a service on a node, it wraps the message in a routing envelope. The envelope is sent to the controller's node router process. The controller's node router process then transmits the envelope to the node's rode relay process which forwards the envelope on to the node service. When the node service receives the envelope, it has access to the sending service name, which is also the sending service's "address," and the actual message itself. The node service replies by replacing the message in the envelope with a reply and sending the envelope back to the node relay process.

Figure 4:
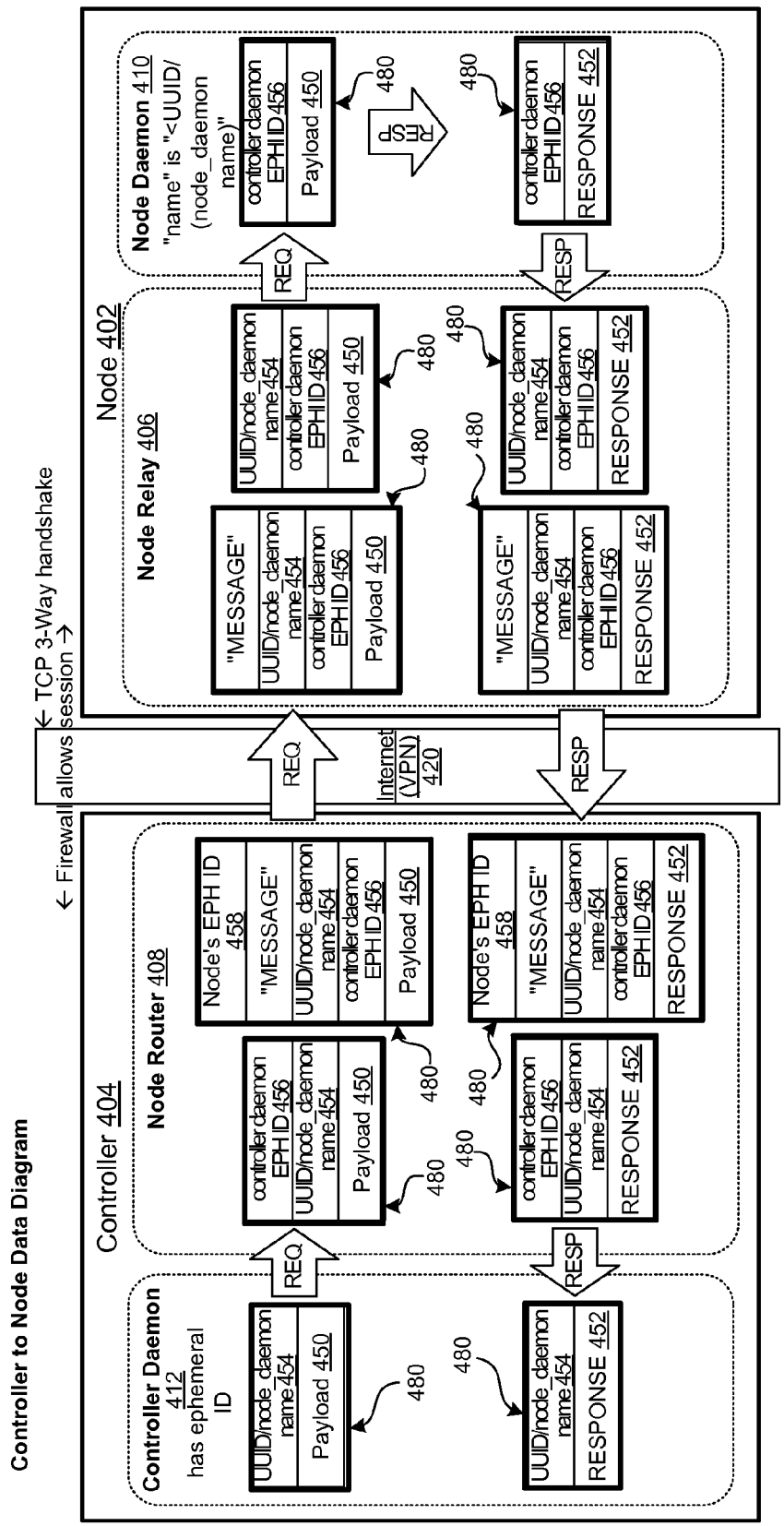
FIG. 4 is a schematic flow diagram showing an example process of wrapping a message to a node in a routing envelope, according to some embodiments.
Figure 5:
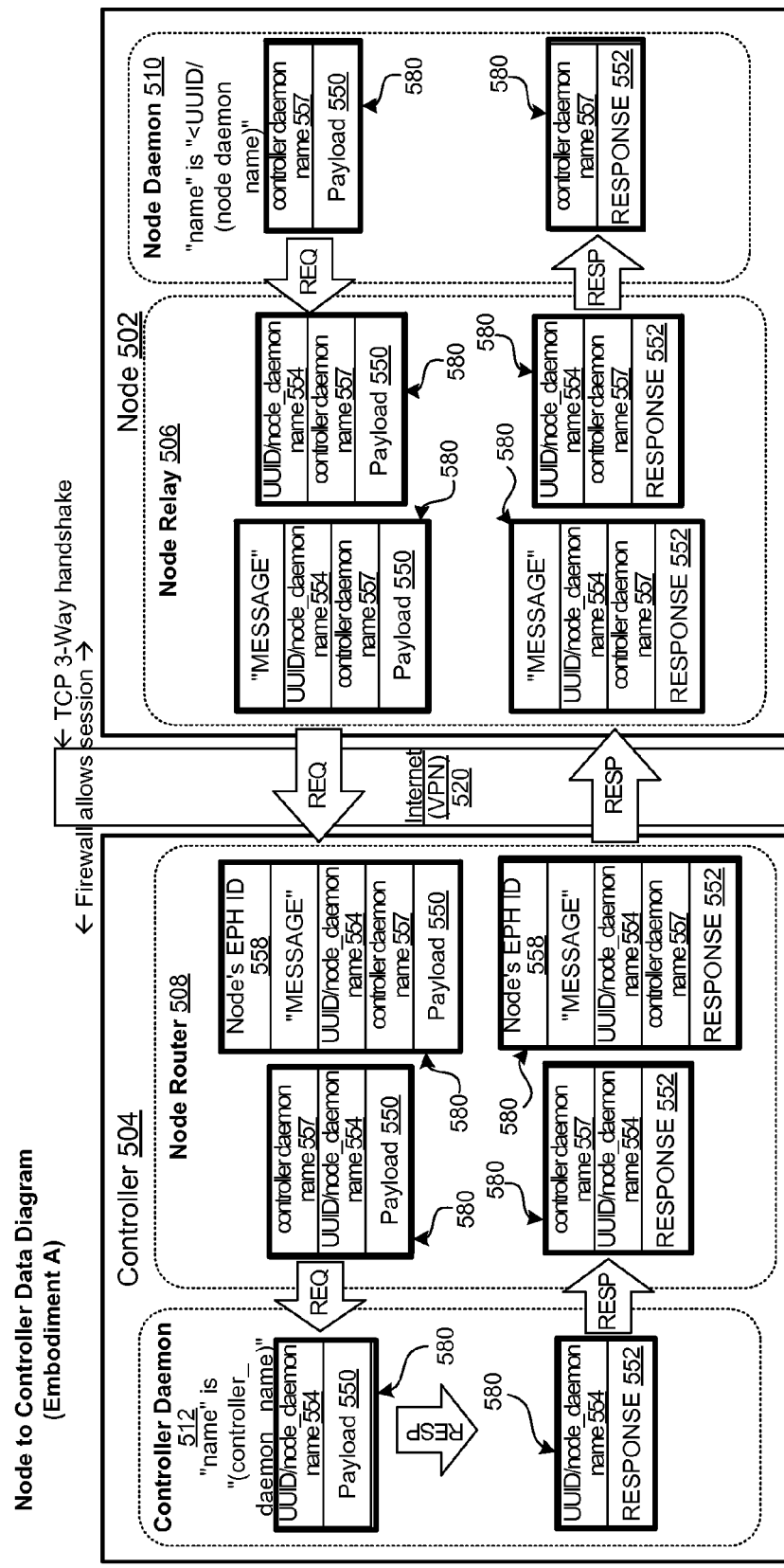
FIG. 5 is a schematic flow diagram showing an example process of wrapping a message to a central management system in a routing envelope, according to some embodiments.
Figure 6A:
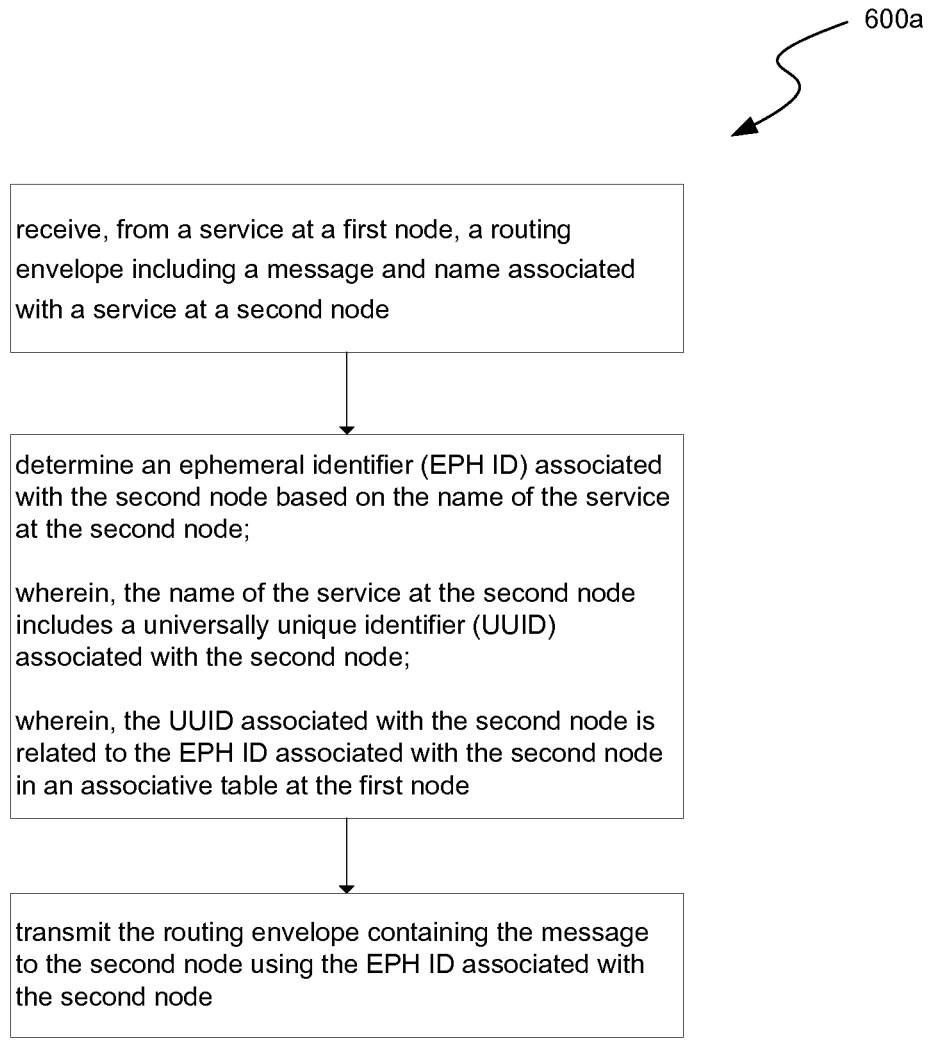
FIGS. 6A-6E show schematic flow diagrams describing example processes for bi-directional message routing by a controller in a computer cluster, according to some embodiments.
Figure 6B:
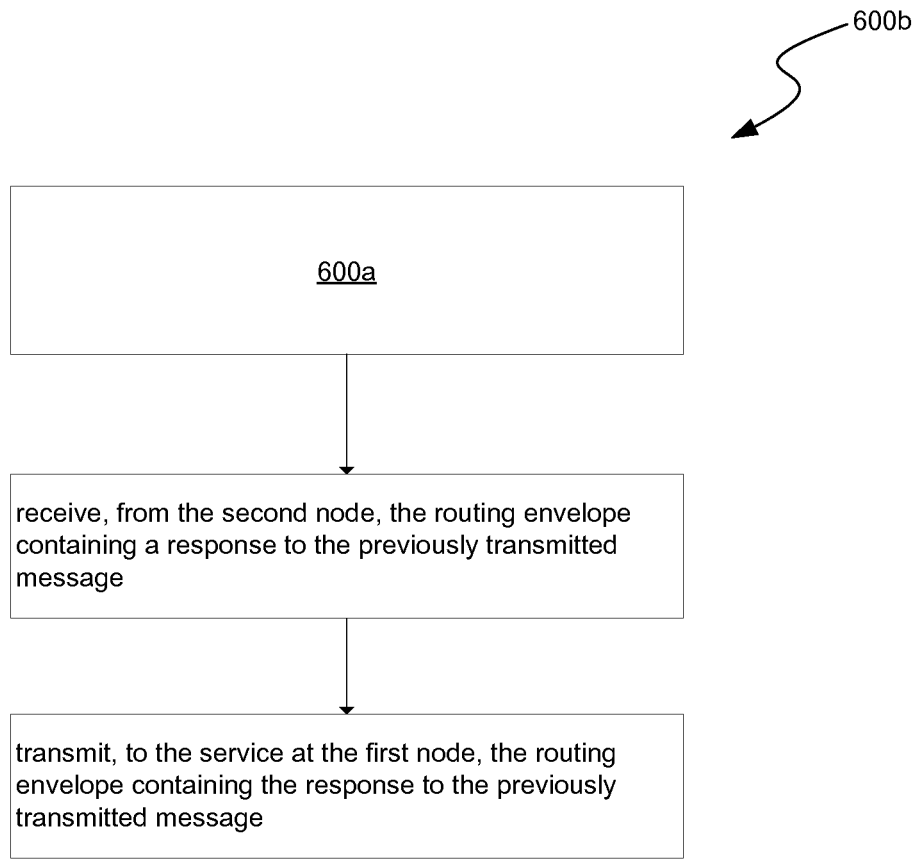
Figure 6C:
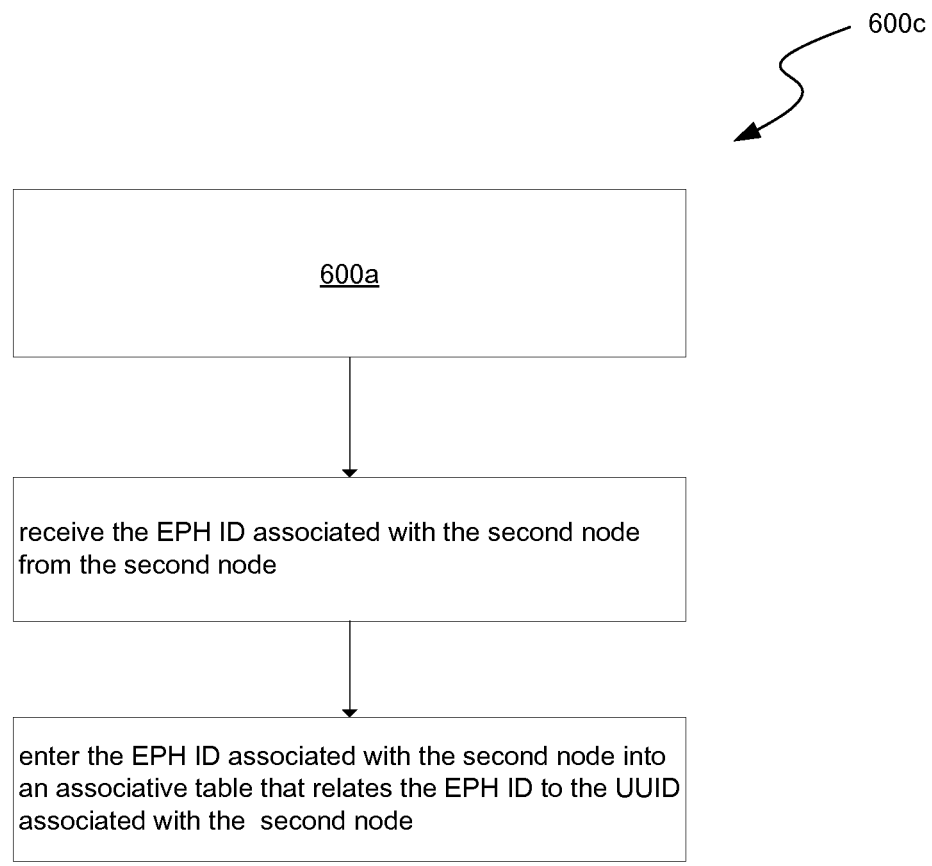
Figure 6D:
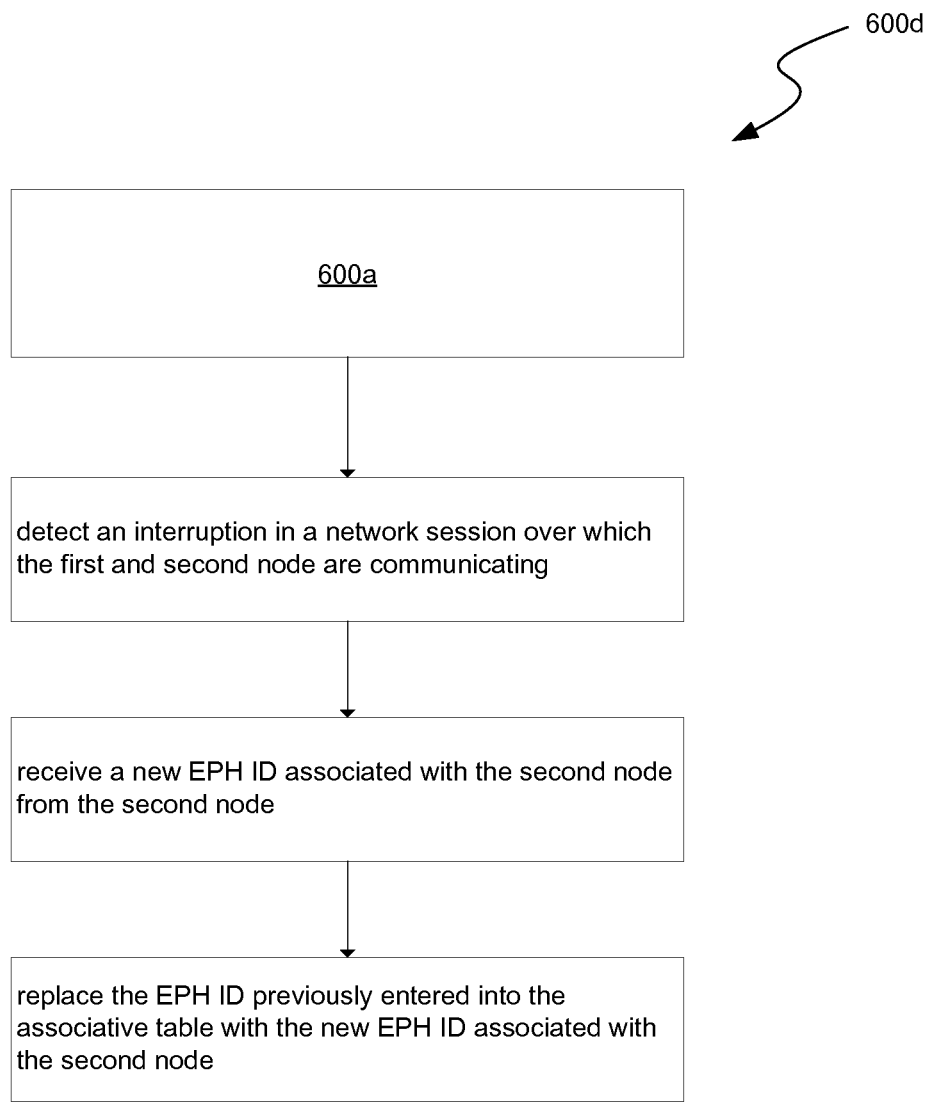
Figure 6E:
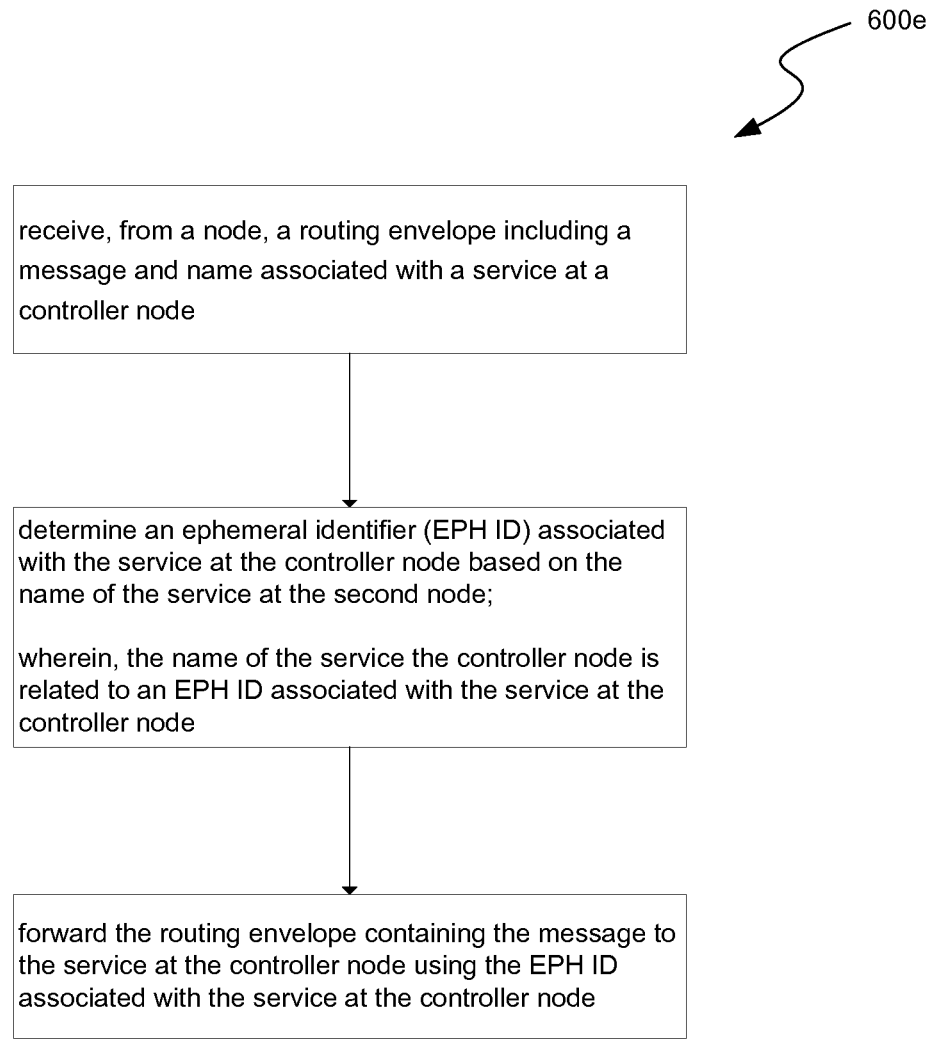
Figure 7A:
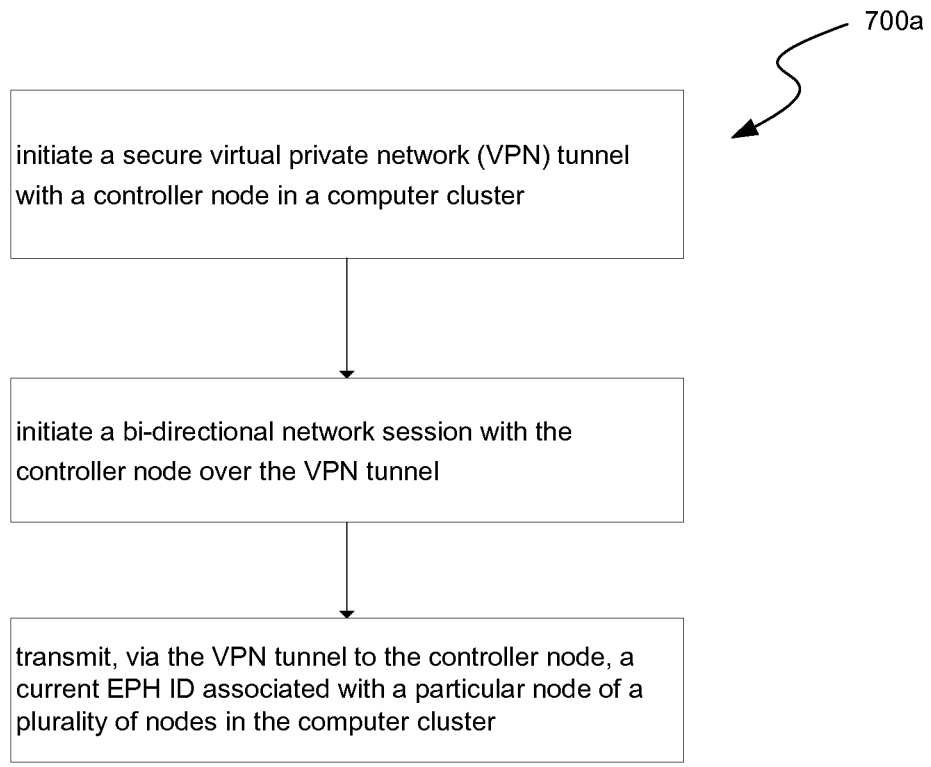
FIGS. 7A-7D show schematic flow diagrams describing example processes for bi-directional message routing by a node in a computer cluster, according to some embodiments.
Figure 7B:
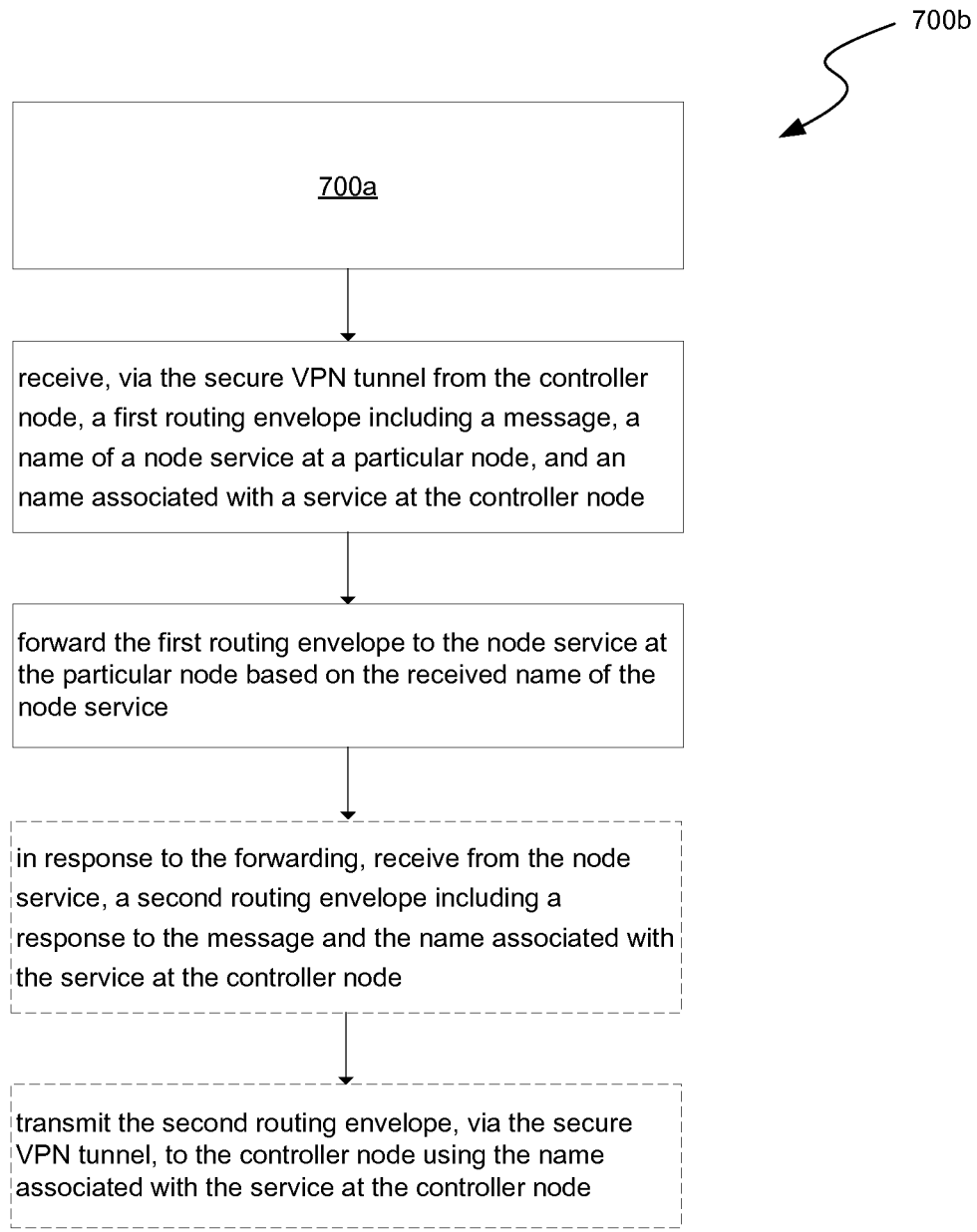
Figure 7C:
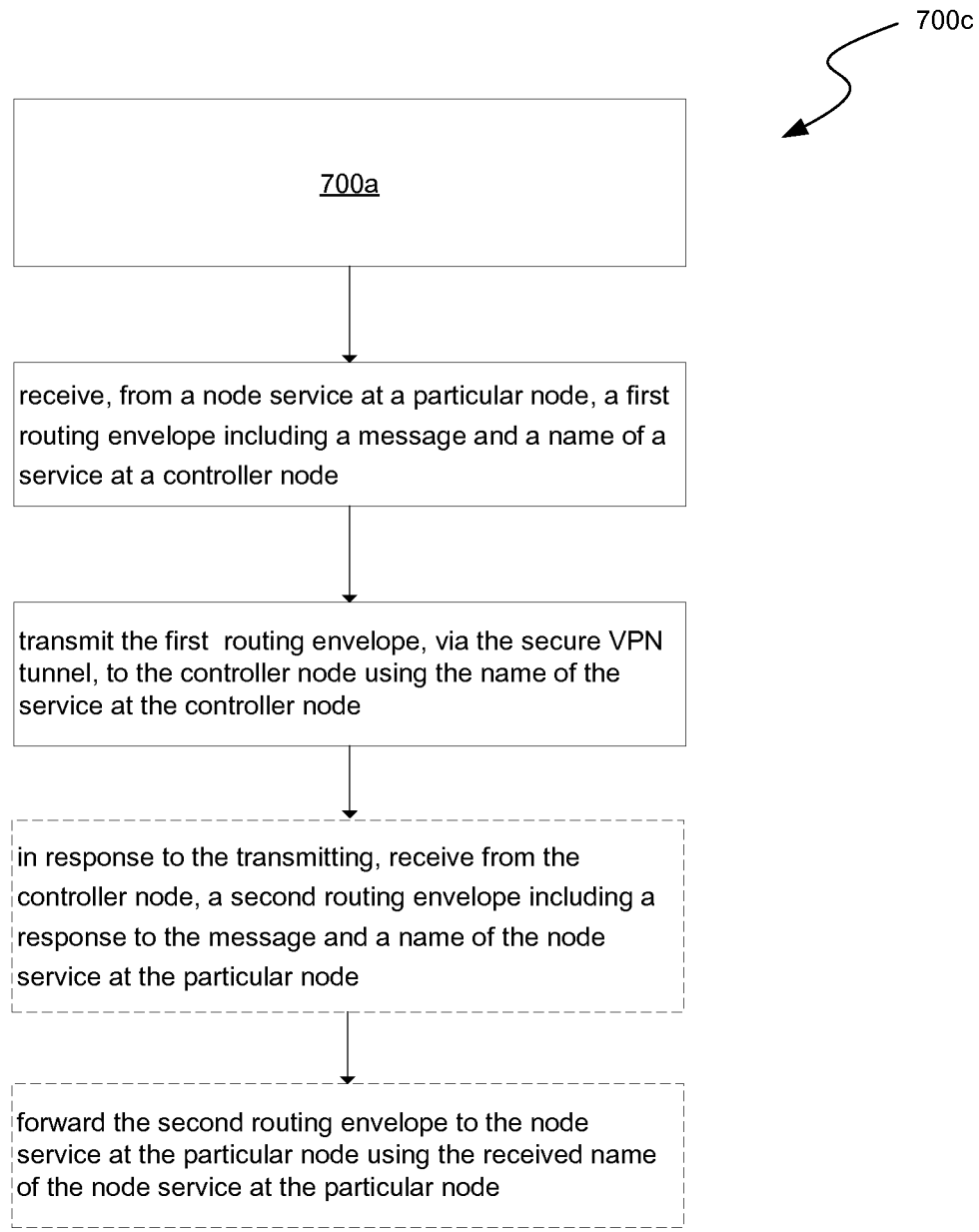
Figure 7D:
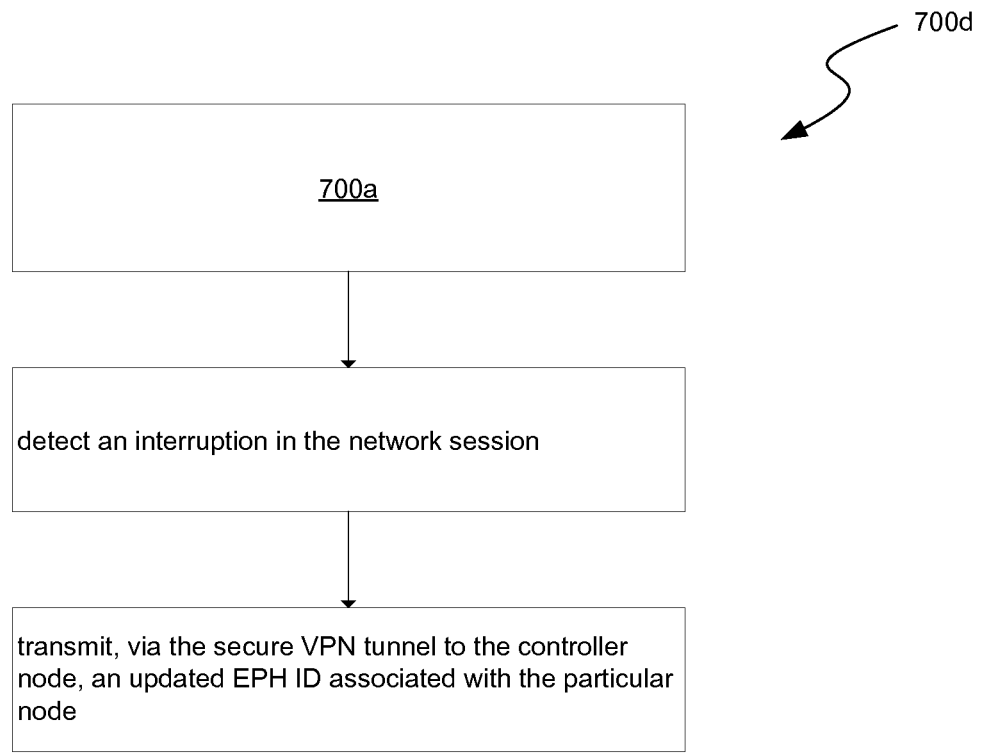

FIG. 4 is a schematic flow diagram showing an example process of wrapping a message to a node in a routing envelope, according to some embodiments, as described above. As shown in FIG. 4, a service running at the controller 404, for example controller daemon 412, may communicate with a service, for example node daemon 410, at a particular node 402, by wrapping a message in an envelope 480. A "daemon" is generally understood to be a component of (or combination of multiple components of) software and/or hardware that runs as a background process (i.e. with no direct input from a user). Accordingly a daemon may provide a service as implemented by the background process. Herein, the terms "daemon" and "service" may be used interchangeably. It shall be appreciated that the daemons described with reference to FIGS. 4 and 5 illustrate example implementations and that the services described in the claims need not be implemented by a single daemon. Retuning to FIG. 4, the controller daemon 412 may just have a name associated with the particular node daemon 410 at node 402, for example UUID/node_daemon name 454 as shown in FIG. 4. When the envelope 480 is handed off to the controller's node router process 408, it may include an ephemeral ID (EPH ID) 456 associated with the controller daemon 412, the name of the service running at the node 454, and the message itself 450. According to some embodiments, the routing envelope may include a name (not shown) associated with the service 412 at the controller 404 instead of or in addition to an EPH ID 456 associated with the service 412 at the controller 404. This name associated with the controller service 412, may include a UUID (not shown) associated with the controller 404. The node router process 408 can then compare the UUID of the destination node 402 (which is part of the name 454 of the service 410 at the node 402) to an ID table containing the current EPH ID 458 associated with that node. Recall, with reference to FIG. 3, that new ephemeral IDs for a node are assigned upon initiation of a new network connection (e.g. after a network interruption). Together, the EPH ID 458 of destination node 402, and the name (e.g. node daemon name 454) of the service running on the destination node 402 (including the UUID of the destination node 402) ensure the delivery of the payload 450 to the correct service at the correct destination node. The envelope 480 now contains the destination node's ephemeral ID 458, the name of the service at the destination node 454, the EPH ID 456 associated with the controller service 412 (and/or a name of the controller service 412), and the message itself 450. With the EPH ID 458 of the destination node 402 established, the node router process 408 may transmit the envelope 480 containing the message 450 via a secure VPN tunnel 420 to the node relay process 406 at the destination node 402. The node relay process 406 then forwards the envelope 480 containing the message 450 to the service at the node 402, for example node daemon 410. In response, the service (node daemon 410) replaces the message 450 in envelope 480 with a response message 452 and hands back off to the node relay process 406. As is shown, the envelope 480 still contains the controller daemon EPH ID 456 that may be necessary for routing back to the controller daemon 412. Alternatively, a name (not shown) associated with the controller daemon 412 may be used for routing back to the controller daemon 412. The node relay 406 transmits the envelope 480 via the secure VPN tunnel 420 to the node router process 408. Using the controller daemon ephemeral ID 456, the node router process 408 then forwards the envelope 480 containing the response 452 to the controller service (e.g. controller daemon 412) at the controller 404.

When a process on the node needs to communicate to a service on the controller, a similar but reversed process occurs. The node service wraps the message in a routing envelope and hands off the envelope to the node's node relay process. The node relay process transmits the envelope on to the node router process on the controller. The node router process hands off the envelope to the controller service on the central management system. When the controller service receives the envelope, it has access to the UUID and sending service name, which together specify the sending service's "address," and the actual message itself. The service replies by replacing the message in the envelope with a reply and sending the envelope back to the node router process.

FIG. 5 is a schematic flow diagram showing an example process of wrapping a message to a controller in a routing envelope, according to some embodiments. As shown in FIG. 5, a service running at the node 502, for example node daemon 510, may communicate with a service, for example controller daemon 512, at a controller 504, by wrapping a message in an envelope 580. When the envelope 580 is handed off to the node relay process 506, it may include a service name 557 associated with the controller daemon 512, the name 554 of the service 510 running at node 502, and the message itself 550. The node relay process 506 then adds the node's ephemeral ID 558 and transmits the envelope 580 via a secure VPN tunnel 520 to the node router process 508 at the controller 504. The node router process 508 hands off the envelope 580 to the controller daemon 512 based on the service name 557 associated with the controller daemon 512.

In an alternative embodiment, the node router process 508 may compare the controller daemon name 557 (included in the received envelope 508 from the node daemon process 510) to an associate table that relates the service name 557 associated with the controller daemon 512 to an EPH ID (not shown) associated with the controller daemon 512. Accordingly, using the EPH ID (not shown) associated with the controller daemon 512, the node router process 508 is able to hand off the envelope 580 to the controller daemon 512.

In response, the controller daemon 512 replaces the message 550 with a response 552 and hands the envelope 580 back to the node router process 508. The node router process 508 can then compare the UUID of the destination node 502 (which is part of the name 554 of the service 510 at the node 502) to an ID table containing the current ephemeral ID 558 associated with that node. With the current ephemeral ID 558 of node 502, the node router process 508 is able to transmit the envelope 580 to the node relay process 506 of the node 502 via the secure VPN tunnel 520. The node relay process 506 then hands off the envelope 580 containing the response 552 to the node service or daemon 510.

FIGS. 6A-6D show schematic flow diagrams describing example processes for bi-directional message routing by a controller in a computer cluster, according to some embodiments. Elements of these processes are also described with reference to FIGS. 2-5. Processes 600a-600e may be performed, by a node router process at a controller node, for example node router processes 208, 308, 408, and 508 in FIGS. 2, 3, 4, and 5, respectively.

FIGS. 7A-7D show schematic flow diagrams describing example processes for bi-directional message routing by a node in a computer cluster, according to some embodiments. Elements of these processes are also described with reference to FIGS. 2-5. Processes 700a-700d may be performed, by a node relay process at any of the plurality of nodes in the computer cluster, for example node relay processes 206, 306, 406, and 506 in FIGS. 2, 3, 4, and 5, respectively.

Background on Computer Systems

Figure 8:
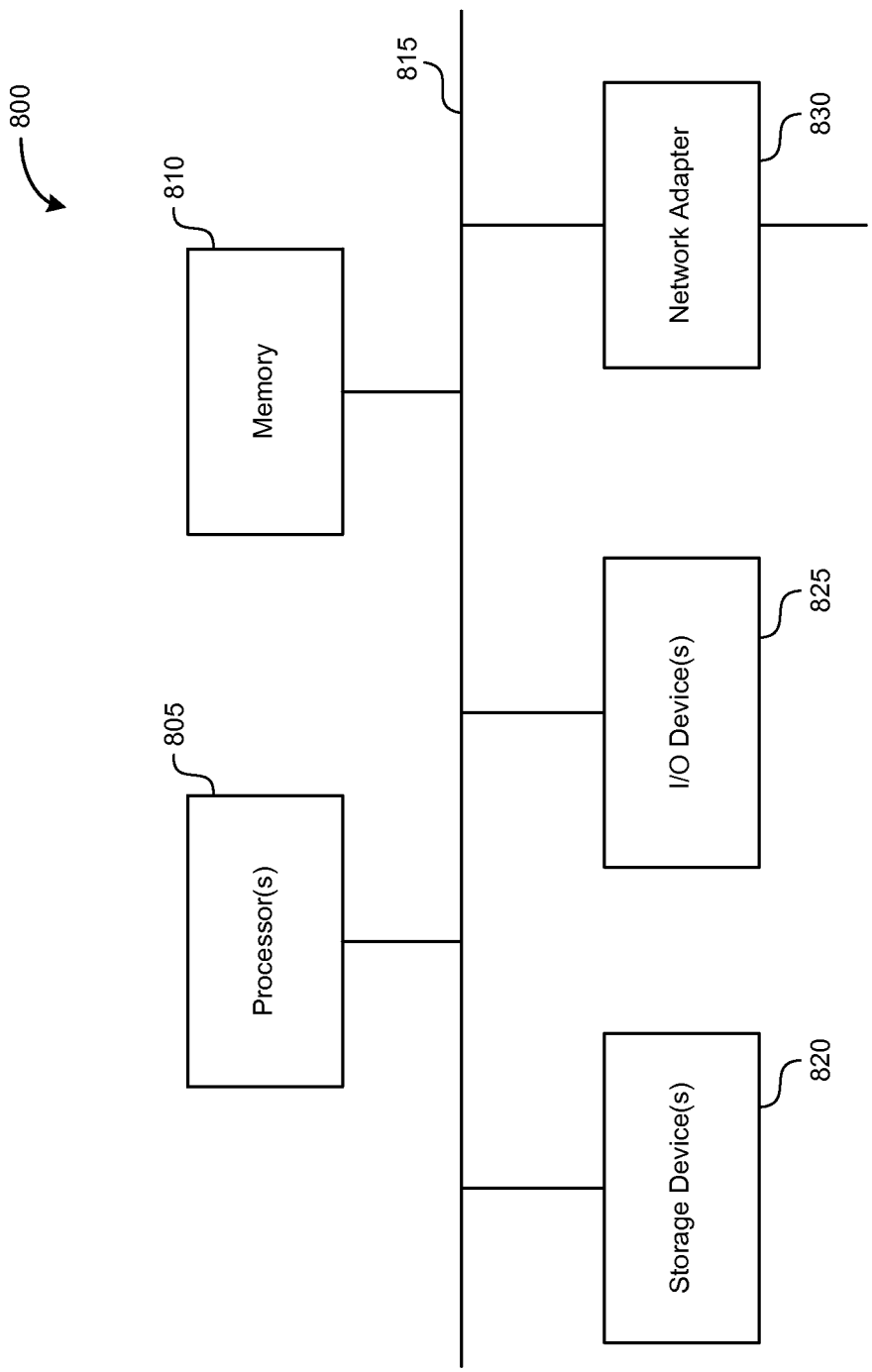
FIG. 8 shows a diagrammatic representation of an example machine in the form of a computer system within which a set of instructions for causing the machine to perform one or more of the methodologies discussed herein may be executed.

FIG. 8 is a block diagram of a computer system 800 as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 800 may include one or more central processing units ("processors") 805, memory 810, input/output devices 825, e.g. keyboard and pointing devices, touch devices, display devices), storage devices 820, e.g. disk drives, and network adapters 830, e.g. network interfaces, that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 810 and storage devices 820 arc computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800, e.g. via network adapter 830.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A computer-implemented method for bi-directional message routing between services running on different nodes in a computer cluster, the method comprising:
    receiving, by a node router at a first node, from a service at the first node, a message wrapped in a routing envelope, wherein the routing envelope includes a name associated with a service at a second node to which the message is to be sent;

determining, by the node router at the first node, an ephemeral identifier (EPH ID) associated with second node based on the name of the service at the second node; and transmitting, by the node router at the first node, via a communications session, the routing envelope containing the message to the second node using the EPH ID associated with the second node;

wherein the EPH ID associated with the second node was received by the first node, from the second node, upon initiation, by the second node, of the communications session; and wherein the EPH ID associated with the second node dynamically changes upon initiation by the second node of a subsequent communications session.

2. The method of claim 1, further comprising:

receiving, from the second node, the routing envelope containing a response to the previously transmitted message; and transmitting, to the service at the first node, the routing envelope containing the response to the previously transmitted message.

3. The method of claim 1, wherein the name of the service at the second node includes a universally unique identifier (UUID) associated with the second node.

4. The method of claim 1, wherein the routing envelope further includes an EPH ID associated with the service at the first node.

5. The method of claim 1, wherein the determining an EPH ID associated with the second node includes:

comparing a universally unique identifier (UUID) associated with the second node to an associative table that relates the UUID to the EPH ID associated with the second node;

wherein, the name of the service at the second node includes the UUID associated with the second node.

6. The method of claim 1, further comprising:

receiving the EPH ID associated with the second node from the second node; and entering the EPH ID associated with the second node into an associative table that relates the EPH ID to the UUID associated with the second node.

7. The method of claim 6, further comprising:

detecting an interruption in the communications session over which the first and second node are communicating;

receiving a new EPH ID associated with the second node from the second node; and replacing the EPH ID previously entered into the associative table with the new EPH ID associated with the second node.

8. The method of claim 1, wherein the first node is a controller node in the computing cluster, and the second node is one of a plurality of nodes in the computing cluster.

9. The method of claim 8, wherein the communications session between the first node and the second node is over a virtual private network (VPN) tunnel, and wherein the plurality of nodes other than the second node are not able to access the VPN tunnel established between the first node and the second node.

10. The method of claim 8, wherein the controller node is accessible to a plurality of clients via a RESTful API.

11. The method of claim 1, wherein the computer cluster is configured as a multi-tenant object storage system.

12. The method of claim 1, wherein a virtual private network (VPN) tunnel is established between the first and second node, wherein the VPN tunnel includes a firewall configured to reject any requests made to the second node to initiate a communications session.

13. A system for facilitating bi-directional message routing between services running on different nodes in a computer cluster, the system operating as a first node in the computer cluster, the system comprising:

one or more processors; and one or more memory units having instructions stored thereon, which when executed by the one or more processors, cause the system to:

receive, from a service at the first node, a message wrapped in a routing envelope, wherein the routing envelope includes a name associated with a service at a second node to which the message is to be sent;

determine an ephemeral identifier (EPH ID) associated with the second node based on the name of the service at the second node; and transmit, via a communications session, the routing envelope containing the message to the second node using the EPH ID associated with the second node;

wherein the EPH ID associated with the second node was received by the first node, from the second node, upon initiation, by the second node, of the communication session; and wherein the EPH ID associated with the second node dynamically changes upon initiation by the second node of a subsequent communications session.

14. The system of claim 13, wherein the one or more memory units have further instructions stored thereon, which when executed by the one or more processors, cause the system to further:

receive, from the second node, the routing envelope containing a response to the previously transmitted message; and transmit, to the service at the first node, the routing envelope containing the response to the previously transmitted message.

15. The system of claim 13, wherein the name of the service at the second node includes a universally unique identifier (UUID) associated with the second node.

16. The system of claim 13, wherein the routing envelope further includes an EPH ID associated with the service at the first node.

17. The system of claim 13, wherein the instructions that cause the system to determine the EPH ID associated with the second node include instructions, which cause the system to:

compare a universally unique identifier (UUID) associated with the second node to an associative table that relates the UUID to the EPH ID associated with the second node;

wherein, the name of the service at the second node includes the UUID of the second node.

18. The system of claim 13, wherein the one or more memory units have further instructions stored thereon, which when executed by the one or more processors, cause the system to further:

receive the EPH ID associated with the second node from the second node; and enter the EPH ID associated with the second node into an associative table that relates the EPH ID to the UUID associated with the second node.

19. The system of claim 18, wherein the one or more memory units have further instructions stored thereon, which when executed by the one or more processors, cause the system to further:

detect an interruption in the communications session over which the first and second node are communicating;

receive a new EPH ID associated with the second node from the second node; and replace the EPH ID previously entered into the associative table with the new EPH ID associated with the second node.

20. The system of claim 13, wherein the first node is a controller node in the computing cluster, and the second node is one of a plurality of nodes in the computing cluster.

21. The system of claim 20, wherein the communications session between the first node and the second node is over a virtual private network (VPN) tunnel, and wherein the plurality of nodes other than the second node are not able to access the VPN tunnel established between the first node and the second node.

22. The system of claim 20, wherein the controller node is accessible to a plurality of clients via a RESTful API.

23. The system of claim 13, wherein the computer cluster is configured as a multi-tenant object storage system.

24. The system of claim 13, wherein a virtual private network (VPN) tunnel between the first and second node, wherein the VPN tunnel includes a firewall configured to reject any requests made to the second node to initiate communications sessions.

25. A computer-implemented method for bi-directional message routing between services running on a controller node and a particular node of a plurality of nodes in a computer cluster, the method comprising:

initiating, by the particular node, a virtual private network (VPN) tunnel with the controller node in the computer cluster;

wherein the VPN includes a firewall configured to reject any requests received by the particular node to initiate communications sessions;

initiating, by the particular node, a bi-directional communications session with the controller node over the VPN tunnel;

transmitting, by the particular node, via the VPN tunnel to the controller node, an ephemeral identifier (EPH ID) associated with the particular node;

wherein the EPH ID is configured to enable the controller node to transmit routing envelopes containing messages to the particular node; and dynamically changing, by the particular node, the EPH ID associated with the particular node upon initiation by the particular node of a subsequent communications session with the controller node.

26. The method of claim 25, wherein the current EPH ID associated with the particular node is required for transmission of data to the particular node.

27. The method of claim 25, further comprising:

receiving, by the particular node, via the VPN tunnel from a service at the controller node, a first routing envelope;

wherein, the first routing envelope includes a message, a name of a node service at the particular node, and a name of the service at the controller node; and forwarding the first routing envelope to the node service at the particular node based on the received name of the node service at the particular node.

28. The method of claim 27, further comprising:

in response to the forwarding, receiving from the node service at the particular node, a second routing envelope;

wherein, the second routing envelope includes a response to the message and the name associated with a service at the controller node; and transmitting the second routing envelope, via the VPN tunnel, to the controller node using the name associated with the service at the controller node.

29. The method of claim 25, further comprising:

receiving, by the particular node, a request to initiate a communications session; and rejecting the request.

30. The method of claim 25, further comprising:

detecting an interruption in the communications session; and transmitting, by the particular node, via the VPN tunnel to the controller node, an updated EPH ID associated with the particular node;

wherein, the updated EPH ID is required for transmission of data to the particular node.

31. The method of claim 25, further comprising:

receiving, by the particular node, a first routing envelope from a node service at the particular node;

wherein, the first routing envelope includes a message and a name of a service at the controller node; and transmitting the first routing envelope, via the VPN tunnel, to the controller node using the name of the service at the controller node.

32. The method of claim 31, wherein the controller node is configured to compare the name associated with the service at the controller node to an associated table that relates the name associated with the service at the controller node to an EPH ID associated with the service at the controller node, and wherein the controller node is further configured to forward the first routing envelope to the service at the controller node using the EPH ID associated with the service at the controller node.

33. The method of claim 31, further comprising:

in response to the transmitting, receiving from the controller node, a second routing envelope;

wherein, the second routing envelope includes a response to the message and a name of the node service at the particular node; and forwarding the second routing envelope to the node service at the particular node using the name of the node service at the particular node.

* * * * *